Oct. 15, 1946.  R. J. BAUNACH  2,409,528
FOOD CONVEYER OR HEATER
Filed March 13, 1944  4 Sheets-Sheet 4
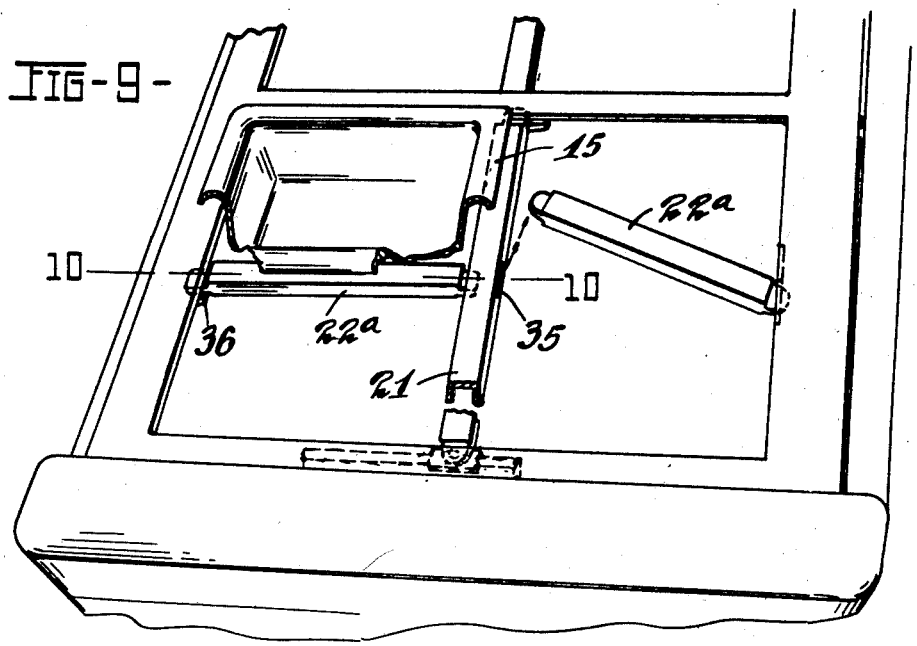
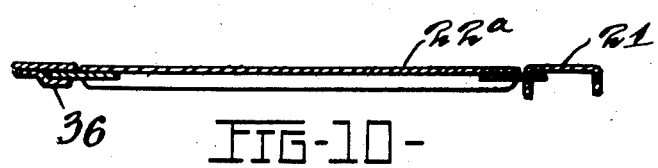
Inventor
ROY J. BAUNACH
By Owen D Owen
Attorneys.

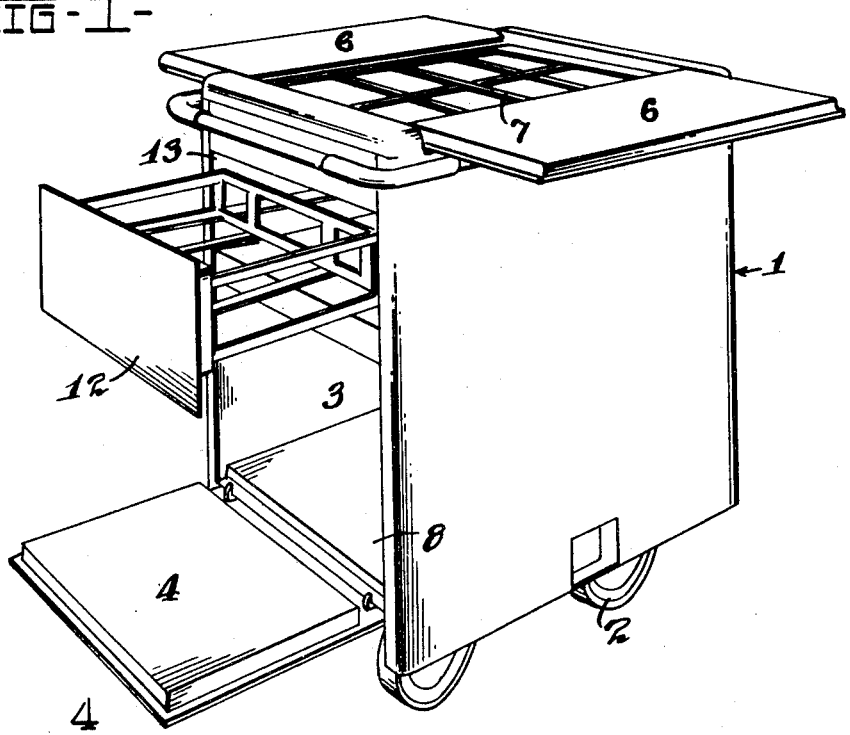
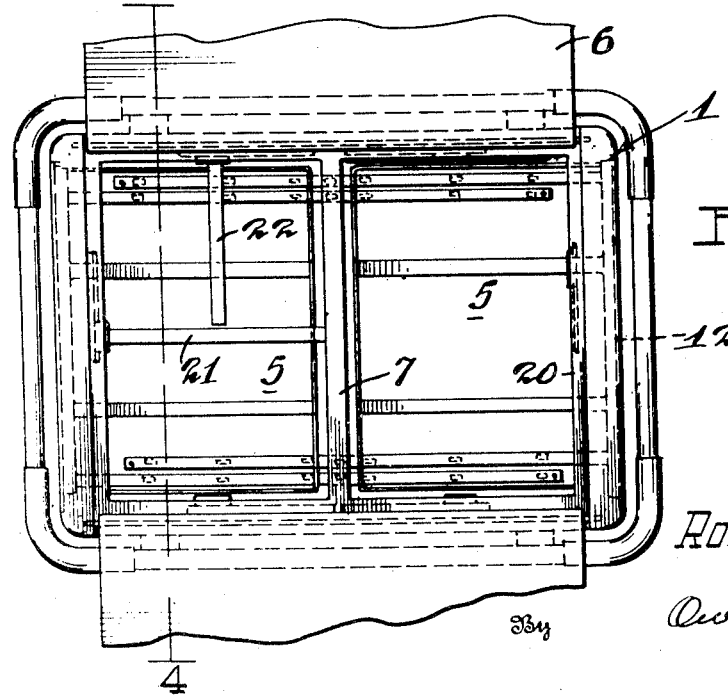

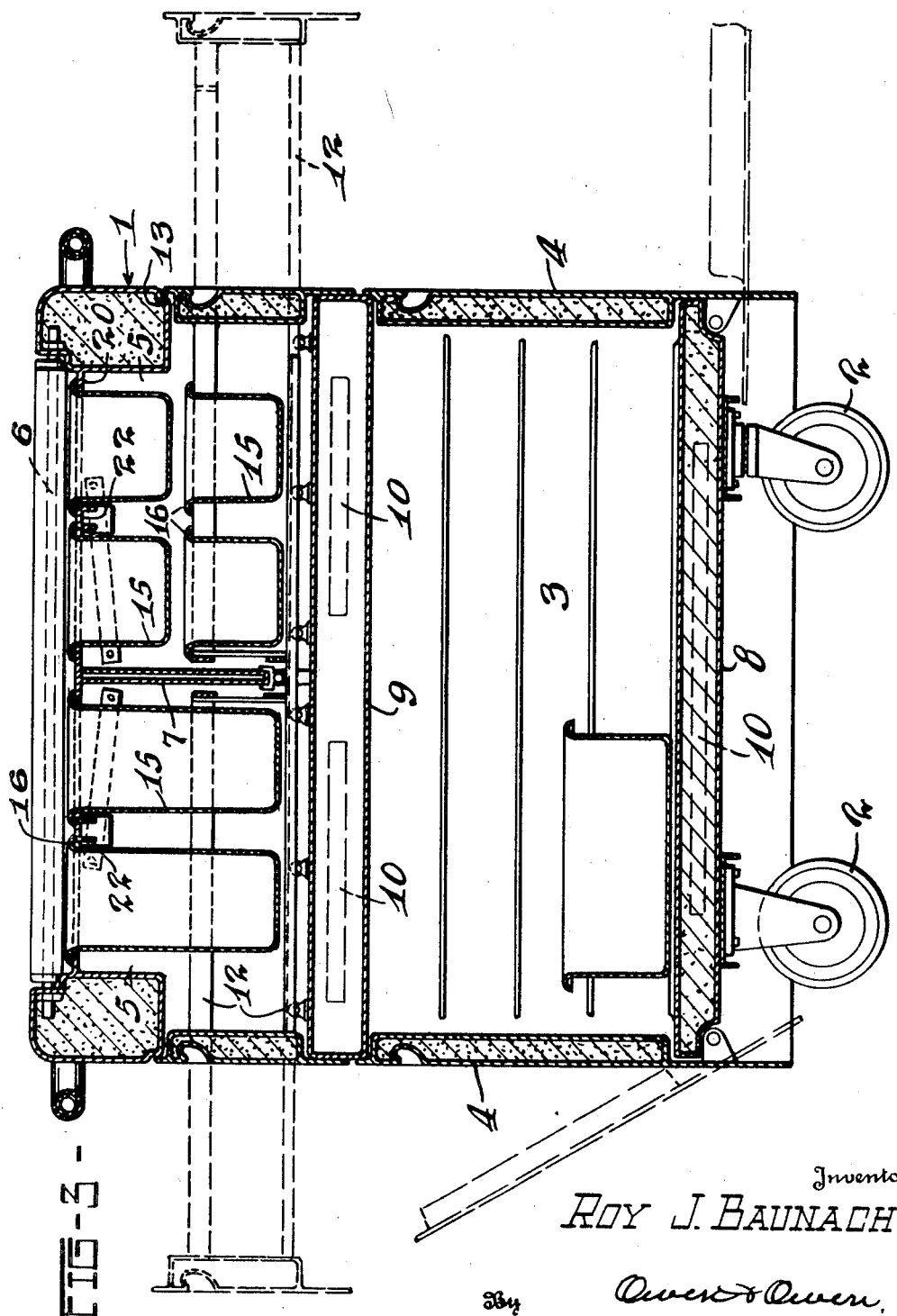

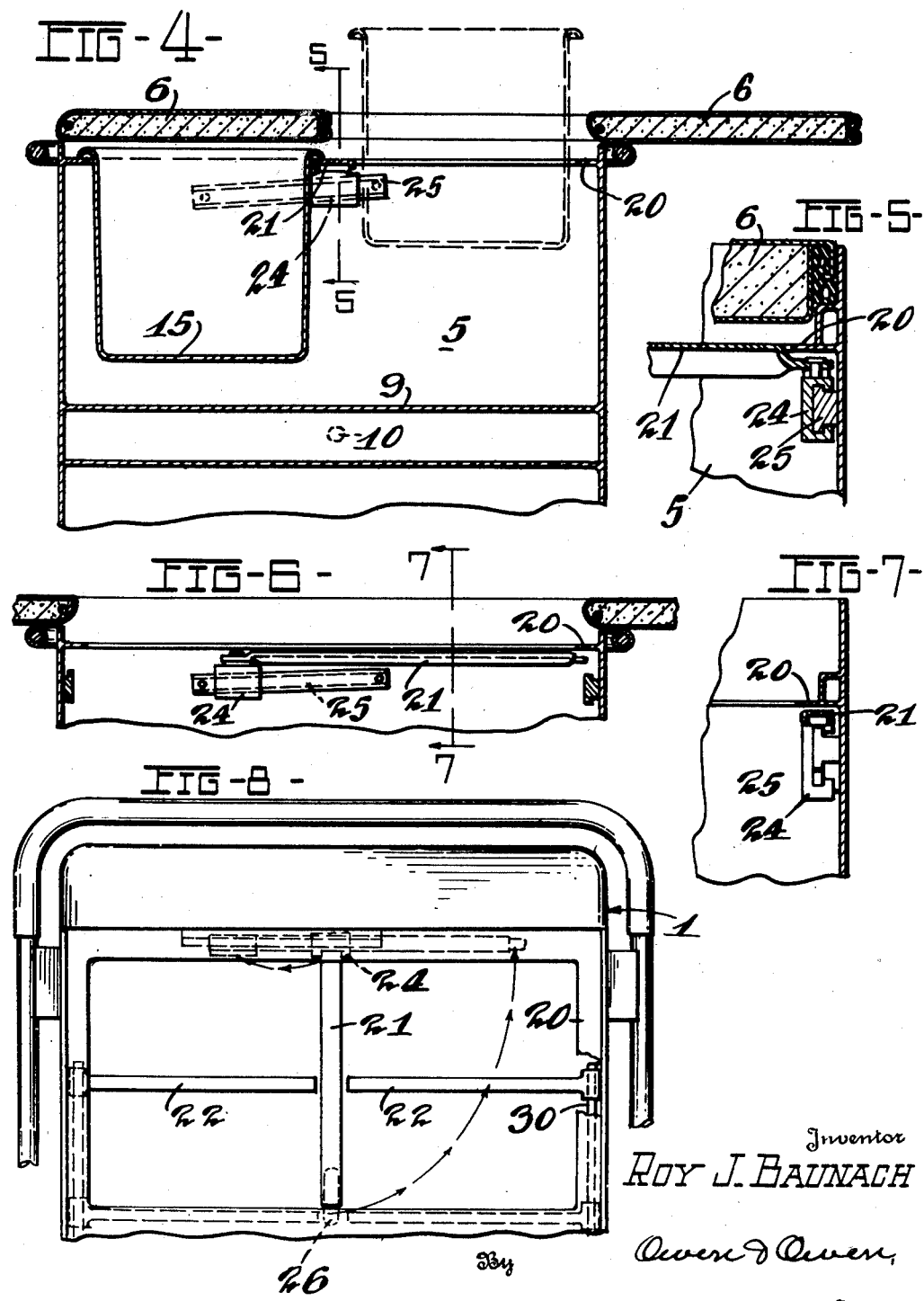

Patented Oct. 15, 1946

2,409,528

UNITED STATES PATENT OFFICE 2,409,528

FOOD CONVEYER OR HEATER

Roy J. Baunach, Toledo, Ohio, assignor to The Swartzbaugh Manufacturing Company, Toledo, Ohio, a corporation of Ohio Application March 13, 1944, Serial No. 526,295

9 Claims. (Cl. 312—172)

This invention relates particularly to food heaters of the conveyer type commonly used in hospitals.

These conveyers are usually of the truck type adapted to hold a plurality of cooking receptacles and are capable of being closed to prevent escape of heat therefrom. The conveyers customarily contain one or more top heating or warming compartments adapted to be closed against the escape of heat by one or more cover members and having provision for the mounting of one or more food receptacles therein. The order, number and shape of such receptacles as to each compartment is fixed, however, or not changeable to suit the quantity or kind of food desired, thus restricting the use of the conveyers.

The primary object of the present invention is the provision of a conveyer of this character which is adapted to have various orders, numbers, sizes and shapes of food receptacles mounted therein to suit the particular use or demand, thereby broadening the scope of use and enhancing the commercial and economic value of the conveyers.

Another object of the invention is the provision in a food conveyer, of means adjustable or operable to permit a heating or warming compartment thereof to be occupied by a single large food receptacle or to be converted into two or more sections for receiving receptacles of predetermined number, shape and size to suit the demands and requirements of the particular use to which applied.

Another object of the invention is the provision of an open top warming compartment for receiving food receptacles through the top thereof and having a drawer in its lower portion which may carry independent food receptacles, or which, upon the omission of such receptacles, may receive the lower ends of deep receptacles placed in the compartment through its top opening.

Other objects and advantages of the invention will be apparent from the following detailed description and from the accompanying drawings illustrating one embodiment thereof, and in which—

Figure 1 is a perspective view, in partially open position, of a food conveyer embodying the invention, and with one arrangement of food receptacle-receiving spaces in its top; Fig. 2 is an enlarged plan view thereof, with parts broken away, and with a different arrangement of food receptacle-receiving spaces; Fig. 3 is an enlarged vertical section of the conveyer showing one arrangement of food receptacles, with parts shown in dotted lines in open or partly open position; Fig. 4 is an enlarged fragmentary vertical section on the line 4—4 in Fig. 2, with one cover member open and with a receptacle shown in dotted lines as partially withdrawn; Fig. 5 is an enlarged fragmentary section on the line 5—5 in Fig. 4; Fig. 6 is a fragmentary vertical section similar to Fig. 4, but taken in a slightly different position, with a division bar shown in folded or unusable position; Fig. 7 is a fragmentary section on the line 7—7 in Fig. 6; Fig. 8 is a fragmentary top plan view showing the several division members in usable positions and with portions broken away; Fig. 9 is a fragmentary top perspective view of the cabinet, with parts broken away and showing a modification of the side division bars, and Fig. 10 is a section on the line 10—10 in Fig. 9.

Referring to the drawings, 1 designates the hollow body of a food conveyer which is of rectangular form in cross-section and is supported by wheels 2 to facilitate movement from place to place, as is customary with such conveyers. In the present instance, this casing is provided in its lower portion with an oven compartment 3 closed at opposite ends by downwardly swinging doors 4, and is provided in its upper portion with one or more open top warming compartments 5 closed on top by a pair of hinged covers 6, 6. In the present instance, there are two compartments 5 separated by a partition 7. The covers 6, when closed, seal the compartments against the escape of heat. The bottom of the oven compartment 3 is formed by a casing 8 and the bottoms of the warming compartments 5 are formed by a hollow casing 9 that separates said compartments from the oven compartment 3. One or more electric heaters, shown at 10 in dotted lines, are mounted in each of these casings and are separately controlled, as is customary in the art.

A sliding drawer 12, preferably of skeleton form to facilitate the circulation of heat through the bottom, sides and top thereof, is mounted in the lower portion of each compartment 5 for an in-and-out movement through an opening 13 in a respective side of the body casing, and in the present instance in opposed relation to the partition 7. When a drawer is in closed position, its outer end cooperates with the body casing to close the opening 13. Each drawer is of less height than the compartment 5 to form a space thereabove within the compartment. In the present instance, the drawer height is about one-half that of the compartment.

Each compartment 5 is adapted to receive one or more food receptacles 15, 15', and these may be of various shapes, sizes and depths, depending on the desired use, and some may be positioned in and carried by the drawers 12. For instance, if short receptacles 15 are used, one or more may be placed in a drawer to be moved in and out therewith, so that access may be had to them by merely opening the drawer and without opening the covers 6, and one or more other short receptacles 15 may at the same time be mounted in the portion of the compartment above the drawer, being suspended therein from the top of the compartment and closed at their tops by the covers 6. Thus access may be had to either the upper or lower set of receptacles without disturbing the other set. Or, if it is desired to use deep receptacles 15', as shown at the left of Fig. 3, the short receptacles may be omitted from the respective drawer 10 and the deep receptacles, which are mounted in the top portion of the compartment, be extended down and into the drawer. In this case, of course, the drawer cannot be opened until the receptacles have been withdrawn.

The receptacles 15, 15' have outwardly turned edge flanges 16 at their upper open ends for engagement over supporting parts of the drawers and the top portion of the body casing. In the case of the drawers, these flanges engage over their top side and end edge portions and possibly over cross pieces in the drawer, as is apparent. In the case of the compartments, each is provided around its upper edge with an inturned receptacle supporting flange 20, and the space within this flange may be divided into two or more receptacle receiving openings by bars 21 and 22, in the provision and adjustability of which one of the features of the invention resides.

The bar 21, in the present instance, extends entirely across the open top of the compartment and is pivoted at one end for horizontal swinging movements to a block 24 that is mounted for sliding movements on a fixed guide-rail 25. This rail has flanged retaining engagement with the block and is fixedly mounted on a slight incline on the compartment wall beneath the flange 20, as best shown in Figs. 4, 5 and 6, so that when the block is at or near the upper end of the incline the bar 21 stands with its top substantially flush with the top of the flange 20 and when at or near the lower end of its movement the bar 21 is lowered sufficiently to permit it to be swung into out-of-way position under the flange, as shown in Fig. 6. It is thus apparent that the bar 21 may be swung to usable position crosswise of its compartment intermediate opposing sides to divide the compartment into two side sections for receiving respective receptacles 15, or it may be placed in unusable position under the flange 20 to adapt the compartment for receiving a single receptacle of a cross-sectional size substantially the same as that of the compartment. The free end of the bar 21 is provided with a tongue 26 which is adapted to engage over a suitable support 27 (Fig. 9) beneath the flange 20 at the opposite side of the compartment to that carrying the guide-rail 25, and thus be supported in usable position.

The purpose of the bar 22 is to divide each side section into two sections to adapt it to receive two smaller receptacles, such bar being shiftable to usable position, as shown in Fig. 8, or to unusable position under the flange 20 at one side of the compartment. To enable such shifting, each bar 22 is mounted at its outer end relative to the bar 21 on a flanged guide-rail 30 that is secured in inclined position to the adjacent side wall of the compartment beneath the flange 20. The rails 30 are attached to the side walls which are in parallel relation to the bar 21 when the latter is in usable position, and extend from near the center of the side wall to which they are attached to an adjoining side wall and have their inclines downwardly toward such latter side wall, so that the bar 22 may be positioned under the flange 20 at a side of the compartment or laterally shifted to usable position therein to divide the side section of the compartment in which it is disposed into two sections, as shown in Fig. 8. The incline of the guide-rail is such that when the bar 22 is in usable position, its top surface is substantially flush with the top surface of the flange 20 and when shifted to unusable position the bar is lowered sufficiently to permit it to pass freely under the side portion of the flange which it parallels.

In Figs. 9 and 10 the side section dividing bars are shown as comprising removable bars 22ᵃ, which have tongues at their ends that are releasably engageable by lateral shifting movement with a respective slot 35 in the bar 21 and a suitable support 36 on the respective side of the body casing and which forms a supporting ledge for the tongue. This bar may be quickly released or engaged with the bar and casing support by a horizontal swinging or twisting movement, and its principal objection over the use of the sliding bar 22 is that it is not a permanent part of the conveyer, and might, therefore, become lost or misplaced.

It is apparent that by the use of the shiftable bars 21 and 22 or 22ᵃ, a warming compartment 5 may be easily and quickly adapted to receive a large receptacle which is substantially the size of the opening within the flange 20 by placing the bars in unusable position beneath the flange 20, or in case of the bar 22ᵃ removing it, or the compartment may be divided into two side compartments for receiving two receptacles by simply placing the bar 21 in usable position, or either or both of the side sections can be divided into two sections for receiving two smaller receptacles by merely placing one or both of the bars 22 or 22ᵃ in usable section dividing position.

It is also apparent that either compartment may have receptacles mounted therein which are substantially as deep as the compartments, in which case they will extend down into the associated drawer 12, or shorter receptacles may be mounted in the upper portion of the compartment and other short receptacles mounted in the registering drawer. This enables a compartment to take care of either one or more deep receptacles of various sizes or a plurality of short receptacles which may have various cross-sectional sizes depending on the size of the compartment section in which positioned. If receptacles are mounted in a drawer and also in the upper portion of the associated compartment, either those in the drawer or those in the upper portion of the compartment may be inspected, removed or replaced without disturbing the others or exposing them to the cooling outside atmosphere.

It will be understood that while the features embodying the invention have been particularly shown and described in connection with a food conveyer, they apply equally as well to a food heating or cooking apparatus either of the stationary or portable type.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. A food conveyer having an open top compartment into which one or more food receptacles may be suspended, a bar, means whereby said bar is pivotally and slidingly attached at one end to a wall of the receptacle adjacent to its top whereby the bar may be swung into and out of dividing relation to the top portion of the compartment and may have an inclined sliding movement lengthwise of such side wall and whereby the bar may be raised to receptacle supporting position in the compartment and may be lowered a predetermined extent relative to the top of the compartment when the bar is slidingly shifted a predetermined distance from said position.

2. In combination, means forming an open top compartment with a marginal inwardly extending edge flange at its top, a guide-rail attached to a wall of the compartment beneath said flange and inclined downwardly from the plane of the flange, a block slidable on said rail lengthwise thereof, and a bar projecting from said block and shiftable therewith from a position under the flange to a position within the open top of the compartment to divide it into a plurality of sections and to cooperate with the flange to support receptacles in suspended relation in said sections.

3. In combination, means forming an open top compartment with a marginal inwardly extending edge flange at its top, an inclined guide-rail attached to a wall of the compartment beneath said flange, a block slidable on said rail lengthwise thereof, and a bar projecting from said block and shiftable therewith from a position under the flange to a position within the open top of the compartment to divide it into a plurality of sections and to cooperate with the flange to support receptacles in suspended relation in said sections, the incline of the guide-rail being such that the bar is raised a predetermined extent within the compartment when it is moved from the former to the latter position.

4. In combination, means forming an open top compartment, a guide-rail attached to one wall of said compartment near its top and extending crosswise of the compartment, a block mounted on said rail for lengthwise shifting movements thereon, a bar pivotally attached at one end to said block and adapted to extend therefrom across the open top of the compartment to divide it into two receptacle receiving sections and to be swung from such position to an unusable position at the side of the compartment to which said rail is attached.

5. In combination, means forming an open top compartment, an inclined guide-rail attached to one wall of said compartment near its top and extending crosswise of the compartment on an incline, a block mounted on said rail for lengthwise shifting movements thereon, a bar pivotally attached at one end to said block and adapted to extend therefrom across the open top of the compartment to divide it into two receptacle receiving sections and to be swung from such position to an unusable position at the side of the compartment to which said rail is attached.

6. In combination, means forming a compartment having an open top, a bar adapted to extend across the open top portion of the compartment to divide it into two receptacle receiving sections and to cooperate with the marginal edge wall of the opening to support receptacles in suspended relation within the sections of the compartment, and means for pivotally mounting the bar at one end to a wall of the compartment to permit it to be swung to usable position across the compartment opening or to unusable position at a side of the compartment and to serve as a support for the bar when in usable position.

7. A combination as called for in claim 6 wherein the pivotal movements of the bar are horizontal together with means for supporting the pivoted end of the bar for predetermined bodily shifting movements crosswise of the wall to which it is mounted.

8. A combination as called for in claim 6 together with a second bar, means whereby said second bar may be supported between said pivoted bar in its usable position and an opposed marginal edge wall of the top opening to divide one of said receiving sections into two receptacle-receiving sections.

9. A combination as called for in claim 6 together with a second bar, means whereby said second bar may be detachably interengaged at its ends with said pivoted bar when in compartment-dividing position and with an opposed marginal edge wall of the top opening to divide one of said receiving sections into two receptacle-receiving sections.

ROY J. BAUNACH.